United States Patent
Vietti et al.

(10) Patent No.: US 10,155,890 B2
(45) Date of Patent: Dec. 18, 2018

(54) PHOSPHATE ADHESION PROMOTERS

(71) Applicants: Dow Global Technologies LLC, Midland, MI (US); Rohm and Haas Company, Philadelphia, PA (US)

(72) Inventors: David E. Vietti, Cary, IL (US); Joseph J. Zupancic, Glen Ellyn, IL (US); Jonathan Barrus, Lake Jackson, TX (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 78 days.

(21) Appl. No.: 15/306,117

(22) PCT Filed: May 4, 2015

(86) PCT No.: PCT/US2015/028981
§ 371 (c)(1),
(2) Date: Oct. 24, 2016

(87) PCT Pub. No.: WO2015/168670
PCT Pub. Date: Nov. 5, 2015

(65) Prior Publication Data
US 2017/0226391 A1 Aug. 10, 2017

Related U.S. Application Data

(60) Provisional application No. 61/987,530, filed on May 2, 2014.

(51) Int. Cl.
C09J 175/08 (2006.01)
B32B 37/12 (2006.01)
B32B 7/12 (2006.01)
C08G 18/38 (2006.01)

(52) U.S. Cl.
CPC .............. *C09J 175/08* (2013.01); *B32B 7/12* (2013.01); *B32B 37/12* (2013.01); *C08G 18/3882* (2013.01); *B32B 2037/1253* (2013.01); *B32B 2375/00* (2013.01)

(58) Field of Classification Search
CPC .............. C08G 18/3878; C08G 18/388; C08G 18/3882; C09J 175/08
See application file for complete search history.

(56) References Cited

U.S. PATENT DOCUMENTS

| | | |
|---|---|---|
| 2,541,027 A | 2/1951 | Bradley |
| 3,251,828 A | 5/1966 | Lutz |
| 3,309,427 A | 3/1967 | Zech et al. |
| 3,580,855 A | 5/1971 | Mickus et al. |
| 3,664,975 A * | 5/1972 | Kerst ................... C08G 18/388 521/108 |
| 4,507,447 A | 3/1985 | Yamazaki et al. |
| 5,096,980 A | 3/1992 | Yamazaki et al. |
| 5,202,391 A | 4/1993 | Yamazaki et al. |
| 5,418,054 A | 5/1995 | Sun |
| 5,478,897 A | 12/1995 | Sasano et al. |
| 8,097,079 B2 | 1/2012 | Terada et al. |
| 2003/0166827 A1 | 9/2003 | Shiraiwa et al. |
| 2007/0161772 A1 | 7/2007 | Shiraiwa et al. |
| 2009/0266482 A1* | 10/2009 | Garmann ............... C08G 18/12 156/275.5 |

OTHER PUBLICATIONS

Popp, et al., "Polyphosphoric Acid as a Reagent in Organic Chemistry", Chem. Rev., vol. 58, pp. 321-401 (1957).

* cited by examiner

*Primary Examiner* — Christopher M Rodd

(57) ABSTRACT

A first aspect of the present invention is an adhesive composition comprising one or more polyisocyanates and one or more phosphate-functional polyols. A second aspect of the present invention is a method of bonding two substrates together to form a bonded article, said method comprising the steps of applying a layer of the composition of the first aspect to one of said substrates, contacting said layer of the composition of claim 1 to a second substrate, and curing or allowing to cure the composition of claim 1. A third aspect of the present invention is a bonded article formed by the method of the second aspect.

7 Claims, No Drawings

PHOSPHATE ADHESION PROMOTERS

A useful type of adhesive composition is one that contains a polyisocyanate and a polyol. When using such adhesive compositions to adhere to a metal surface, it is often desirable to include a phosphate-functional compound as an adhesion promoter. In the past, adhesion promoters included phosphate esters made from diglycidyl ethers such as, for example, bisphenol A diglycidyl ether. The use of diglycidyl ethers is undesirable for health, safety, and environmental reasons. It is desired to provide a phosphate functional adhesion promoter that is not made using diglycidyl ether. It is desired to provide such an adhesion promoter for use in adhesive compositions that are used in making packages that hold food. It is desired that adhesives that contain such an adhesion promoter retain their adhesive properties even after exposure to a mixture of vinegar, oil, and ketchup.

U.S. Pat. No. 3,309,427 describes polyhydroxy phosphate esters suitable for use in making polyurethane foams. In the method taught by U.S. Pat. No. 3,309,427, a polyhydric alcohol is reacted with a polyphosphoric acid to form an acidic partial ester, which is then reacted with sufficient quantity of a 1,2-alkylene oxide to substantially neutralize the acidity; after the neutralization step, the product is then mixed with polyisocyanate to form rigid polyurethane foam. It is desired to provide an adhesive composition that contains an adhesion promoter that has hydroxyl functional groups and also one or more phosphate functional groups.

The following is a statement of the invention.

A first aspect of the present invention is an adhesive composition comprising one or more polyisocyanates and one or more phosphate-functional polyols.

A second aspect of the present invention is a method of bonding two substrates together to form a bonded article, said method comprising the steps of applying a layer of the composition of the first aspect to one of said substrates, contacting said layer of the composition of claim 1 to a second substrate, and curing or allowing to cure the composition of claim 1.

A third aspect of the present invention is a bonded article formed by the method of the second aspect.

The following is a detailed description of the invention.

As used herein, the following terms have the designated definitions, unless the context clearly indicates otherwise.

As used herein, a polyisocyanate is a compound that contains two or more isocyanate groups. Polyisocyanates may be monomeric or non-monomeric. As used herein, a "monomeric polyisocyanate" is a compound that has two or more isocyanate groups, that has molecular weight of less than 500, and that has no urethane linkage and no urea linkage. Any polyisocyanate that is not a monomeric polyisocyanate is a non-monomeric polyisocyanate.

As used herein, "MDI" is methylene diphenyl diisocyanate, also called diphenylmethane diisocyanate. MDI exists as one of three isomers (4, 4' MDI, 2,4' MDI, and 2,2' MDI) or as a mixture of two or more of these isomers. As used herein, unless specifically stated otherwise, "MDI" does not refer to polymeric MDI (sometimes called PMDI). Polymeric MDI is a compound that has a chain of three or more benzene rings connected to each other by methylene bridges, with an isocyanate group attached to each benzene ring.

A hydroxyl group has the structure —OH, where the oxygen atom is bonded to a carbon atom, and the —OH group is not part of a carboxyl group. A compound with two or more hydroxyl groups is a polyol. A polyol with exactly two hydroxyl groups is a diol. A polyol with exactly three hydroxyl groups is a triol. As used here, a "higher polyol" is a polyol having 3 or more hydroxyl groups. An alkyl polyol is a compound that is an alkane with two or more substituent hydroxyl groups and no atoms other than carbon and hydrogen except for the oxygen atoms that are part of hydroxyl groups. An alkyl higher polyol is an alkyl polyol having three or more substituent hydroxyl groups.

A compound that contains two or more ether linkages in the same linear chain of atoms is known herein as a polyether. A compound that contains two or more ester linkages in the same linear chain of atoms is known herein as a polyester. A compound that is a polyester and a polyol is a polyester polyol, and a compound that is a polyether and a polyol is a polyether polyol.

Some non-monomeric polyisocyanates are reaction products of one or more polyisocyanate with one or more compound with plural active hydrogen compounds, where such reaction products have two or more un-reacted isocyanate groups. Such non-monomeric polyisocyanates may be, for example, the reaction products of one or more polyisocyanate with one or more polyol or the reaction products of one or more polyisocyanate with one or more polyamine or a mixture thereof. A polyisocyanate that is a reaction product of one or more polyisocyanate with one or more compound with plural active hydrogen compounds and that has molecular weight of 500 or more is known herein as a prepolymer. Because the prepolymer is a polyisocyanate, it is known herein as an isocyanate functional prepolymer.

A useful method of characterizing the amount of isocyanate groups in a composition is "% NCO," which is the total weight of all isocyanate groups present in the composition, divided by the total weight of the composition, expressed as a percentage.

A compound is said herein to be phosphate-functional if that compound contains the structure I:

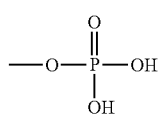

A phosphate-functional polyol is a compound has two or more hydroxyl groups and one or more structure I. A compound is said herein to be phosphorous-free if that compound contains no atom of phosphorous.

Included in structure I are structures in which one or more of the acidic hydrogen atoms has been abstracted. The acid hydrogen atoms are the hydrogen atoms attached to oxygen atoms that are attached to a phosphorous atom. When one or more acidic hydrogens has been abstracted, the phosphate group is an anion.

As used herein, the phrase "a phosphoric-type acid" means orthophosphoric acid or any member of the series of compounds that may be made by condensation of orthophosphoric acid by the elimination of water or any mixture thereof. That series includes, for example, pyrophosphoric acid, tripolyphosphoric acid, and polyphosphoric acids.

A composition is said herein to "cure" as chemical reactions take place that desirably cause an increase in the molecular weight of the composition and/or cause crosslinking of the composition so as to improve the properties of the composition. Such chemical reactions are known as "curing reactions." The composition is said to be "cured" when such reactions are complete or when the curing reactions have progressed sufficiently far that the properties of the composition are useful and are not appreciably changing over time. A composition that is capable of undergoing one or more curing reaction is a curable composition.

As used herein, when a composition is said to have "little or no" amount of an ingredient, it is meant that the amount of that ingredient is either zero or is 0.01% by weight or less, based on the weight of the composition.

A polymer film is a structure that is made of a polymer or mixture of polymers and that is 0.5 mm or less in one dimension and is 1 cm or more in both of the other two dimensions. The composition of a polymer film is 80% or more by weight one or more polymer, based on the weight of the film.

When a quantity is described herein as "X to Y," it is meant that the quantity is a number that is greater than or equal to X and also is less than or equal to Y. When a ratio is described herein as "R:1 or greater," it is meant that the ratio is S:1, where S is a number greater than or equal to R. Similarly, when a ratio is described herein as "T:1 or less," it is meant that the ratio is U:1, where U is a number less than or equal to T.

The adhesive composition of the present invention contains one or more polyisocyanate. Preferred polyisocyanates are MDI, polymeric MDI, carbodiimide-modified MDI, isocyanate functional prepolymers, and mixtures thereof. More preferred polyisocyanates are carbodiimide-modified MDI, isocyanate functional prepolymers, and mixtures thereof. Still more preferred polyisocyanates are isocyanate functional prepolymers. Carbodiimide-modified MDI has one or more carbodiimide linkages that stabilize the compound against hydrolytic degradation; the carbodiimide linkage is reversible; dissociation of the carbodiimide linkage generates an additional isocyanate function. Preferred isocyanate functional prepolymers are reaction products of one or more isomers of MDI with one or more polyols. When making the prepolymer, the preferred MDI is a mixture of isomers in which the amount of 4,4'-MDI is 90% or more by weight based on the weight of all MDI isomers. When making the prepolymer, preferred polyols include one or more polyester polyol, one or more polyether polyol, or a mixture thereof; more preferred are polyester polyols. Preferred prepolymers have % NCO of 0.5% or more; more preferably 1% or more; more preferably 2% or more. Preferred prepolymers have % NCO of 30% or less; more preferably 25% or less.

The composition of the present invention contains one or more phosphate-functional polyol. A phosphate functional polyol may be represented by structure II:

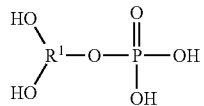

where $R^1$ is any organic group. In addition to the pendant groups shown in structure II, $R^1$ may or may not have one or more additional pendant —OH groups, and $R^1$ may or may not have one or more additional pendant groups of structure I. Any two or more of the —OH groups and the group(s) of structure I may or may not be attached to the same atom of $R^1$. Preferably, each —OH group and each group of structure I is attached to a separate atom of $R^1$.

A convenient way to characterize $R^1$ is to describe the compound having structure III:

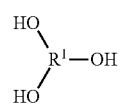

where $R^1$ is the same as in structure II. The compound having structure III is known herein as a "precursor polyol."

Preferred precursor polyols have molecular weight of 90 or higher; more preferably 200 or higher; more preferably 400 or higher. Preferred precursor polyols have molecular weight of 4,000 or lower; more preferably 2,000 or lower; more preferably 1,200 or lower; more preferably 900 or lower; more preferably 500 or lower.

Preferred precursor polyols are alkyl higher polyols, monosaccharides, disaccharides, and compounds having structure IV:

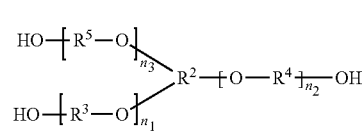

where each of $R^2$, $R^3$, $R^4$, and $R^5$ is, independent of the other, any organic group; each of $n_1$, $n_2$, and $n_3$ is, independent of the other, an integer from 0 to 10. In addition to the pendant groups shown in structure IV, $R^2$ may or may not have one or more additional pendant groups. It is further understood that any two or more of the pendant groups may or may not be attached to the same atom of $R^2$. In some embodiments, a mixture of compounds having structure IV is present, where the compounds of structure IV differ from each other in the value of one or more of $n_1$, $n_2$, and $n_3$; such mixtures are described herein by stating a non-integer value for the parameter $n_1$, $n_2$, or $n_3$, where the non-integer value represents the number average of that parameter. When it is desired to assess the molecular weight of such a mixture, the number-average molecular weight is used.

Among precursor polyols having structure IV, preferably each pendant group is attached to a separate atom of $R^2$.

Among precursor polyols having structure IV, preferably, one or more of $R^3$, $R^4$, and $R^5$ is a hydrocarbon group having 1 to 4 carbon atoms; more preferably 2 to 3 carbon atoms; more preferably 3 carbon atoms. Among precursor polyols having structure IV, preferably, one or more of $R^3$, $R^4$, and $R^5$ is an alkyl group, which may be linear or cyclic or branched or a combination thereof; more preferably, one or more of $R^3$, $R^4$, and $R^5$ is a linear or branched alkyl group; more preferably, one or more of $R^3$, $R^4$, and $R^5$ is a branched alkyl group. Preferably, $R^3$, $R^4$, and $R^5$ are identical to each other.

Among precursor polyols having structure IV, preferably, one or more of $n_1$, $n_2$, and $n_3$ is from 0 to 8. Among precursor polyols having structure IV, preferably, one or more of $n_1$, $n_2$, and $n_3$ is 1 or more. Among precursor polyols having structure IV, preferably, one or more of $n_1$, $n_2$, and $n_3$ is 6 or less. Among precursor polyols having structure IV, preferably, $n_1$, $n_2$, and $n_3$ are the same as each other.

A preferred group of precursor polyols having structure IV are compounds in which each of $R^2$, $R^3$, $R^4$, and $R^5$ is an alkyl group; such precursor polyols are known herein as alkoxylated alkyl triols. In a triol, when at least one of $n_1$, $n_2$, and $n_3$ is 1 or more and $R^2$ has the structure V:

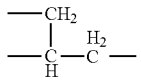

then the triol is known herein as an alkoxylated glycerol. In alkoxylated triols, when each of $R^3$, $R^4$, and $R^5$ is a branched alkyl group with exactly 3 carbon atoms, the alkoxylated triol is known herein as a propoxylated triol. A propoxylated triol in which $R^2$ has structure V is known herein as propoxylated glycerol.

Among precursor polyols that are alkyl higher polyols, preferred are those with 10 or fewer carbon atoms; more preferred are those with 6 or fewer carbon atoms; more preferred are those with 3 or fewer carbon atoms; more preferred is glycerol.

More preferred precursor polyols are alkyl higher polyols and compounds having structure IV; more preferred are compounds having structure IV. It is noted that, if $n_1=n_2=n_3=0$ and if $R^2$ is either an alkyl group or an alkyl group having hydroxyl groups, then the compound having structure IV is an alkyl higher polyol.

A preferred group of precursor polyols are alkyl triols and alkoxylated alkyl triols. Among these, more preferred are glycerol and alkoxylated glycerols; more preferred are alkoxylated glycerols. Among alkoxylated glycerols, preferred are propoxylated glycerols.

Another class of suitable phosphate-functional polyols are those that contain urethane linkages. Preferably, members of this class are made by reacting one or more suitable phosphate-functional polyol with one or more polyisocyanate, preferably including one or more diisocyanate. Preferably, the amount of polyisocyanate is kept low enough so that some or all of the reaction products are phosphate-functional polyols. Alternatively, the polyol may be first reacted with the polyisocyanate to make an OH terminated prepolymer which is then reacted with polyphosphoric acid.

A preferred method of making the phosphate-functional polyol of the present invention is to react a precursor polyol with phosphoric-type acid to produce the compound having structure II.

Preferably, the amounts of phosphoric-type acid and precursor polyol are chosen to determine the ratio of Mp:Mx as follows:
Mhy=number of hydroxyl groups per molecule of the precursor polyol
Nx=Mhy−2
Mx=(moles of precursor polyol)×Nx
Mp=moles of phosphorous atoms contained in the phosphoric-type acid Preferably, the ratio of Mp:Mx is 0.1:1 or higher; more preferably 0.2:1 or higher; more preferably 0.5:1 or higher; more preferably 0.75:1 or higher. Preferably, the ratio of Mp:Mx is 1.1:1 or less.

Preferably, the weight ratio of phosphoric-type acid to precursor polyol is 0.005:1 or higher; more preferably 0.01:1 or higher; more preferably 0.02:1 or higher. Preferably, the weight ratio of phosphoric-type acid to precursor polyol is 0.3:1 or lower; more preferably 0.2:1 or lower; more preferably 0.12:1 or lower.

Preferably, the phosphoric-type acid contains polyphosphoric acid. Preferably, the amount of polyphosphoric acid in the phosphoric-type acid is, by weight based on the weight of the phosphoric-type acid, 75% or more; more preferably 80% or more; more preferably 90% or more. Polyphosphoric acid is available in various grades; each grade is characterized by a percentage. To determine the grade, it is first recognized that pure monomeric orthophosphoric acid, the content of phosphorous pentoxide is considered to be 72.4%. Any grade of polyphosphoric acid can also be analyzed, to consider that one mole of polyphosphoric acid (formula weight labeled "Fppa") contains the number of moles of phosphorous pentoxide labeled "Nppo," and the phosphorous pentoxide percentage ("PCppo") is given by PCppo=(Nppo×142)/Fppa, expressed as a percentage. Then, the grade of that polyphosphoric acid is the ratio, expressed as a percentage: Grade=PCppo/72.4.

Preferably, polyphosphoric acid is used that has grade of 100% or higher; more preferably 110% or higher. Preferably, polyphosphoric acid is used that has grade of 150% or lower; more preferably 125% or lower.

Preferably, the adhesive composition of the present invention contains one or more phosphorous-free polyols in addition to the one or more phosphate-functional polyols.

One preferred method (herein "method A") of including a phosphorous-free polyol in the composition is as follows. A phosphate-functional polyol is made by reacting a precursor polyol that is a phosphorous-free polyol with phosphoric-type acid. An amount of phosphoric-type acid is used so that, even if every phosphorous atom in the phosphoric-type acid were to react with a hydroxyl group on the phosphorous-free polyol, the amount of phosphorous-free polyol that remained phosphorous-free at the completion of the reaction would be, by weight based on the weight of the phosphorous-free polyol prior to the reaction, preferably 50% or more; more preferably 75% or more. An amount of phosphoric-type acid is used so that, even if every phosphorous atom in the phosphoric-type acid were to react with a hydroxyl group on the phosphorous-free polyol, the amount of phosphorous-free polyol that remained phosphorous-free at the completion of the reaction would be, by weight based on the weight of the phosphorous-free polyol prior to the reaction, preferably 99% or less; more preferably 95% or less.

Preferably, method A is used.

Regardless of the method used for making the phosphate-functional polyol, in some embodiments the adhesive composition of the present invention contains a phosphorous-free polyol (herein called "precursor-type" polyol) that has the same structure as a phosphate-functional polyol present in the composition, except that in each position where a phosphate group is present on the phosphate-functional polyol, a hydroxyl group is present on the phosphorous-free polyol. A precursor-type polyol may be present because it is left over from the process that made the phosphate-functional polyol, or a precursor-type polyol may be present because it is added to the composition after formation of the phosphate-functional polyol, or a combination thereof.

In addition to method A or instead of method A, one or more phosphorous-free polyols in addition to the one or more phosphate-functional polyols may be introduced by adding one or more phosphorous-free polyol (herein called a "non-precursor" polyol) that is not a precursor-type polyol. Suitable non-precursor polyols include polyether polyols, polyester polyols, polyether-polyester polyols, alkyl polyols, polyols that have a single ether linkage, polyols that have a single ester linkage, and mixtures thereof.

Preferably, the total amount of polyols in the adhesive composition of the present invention is, in parts by weight based on 100 parts by weight of the total of all polyisocyanate compounds in the composition, 1 part or more; more preferably 2 parts or more. Preferably, the total amount of polyols in the adhesive composition of the present invention is, in parts by weight based on 100 parts by weight of the total of all polyisocyanate compounds in the composition, 800 parts or less; more preferably 600 parts or less.

Preferably, the composition of the present invention contains one or more solvent. A solvent is a liquid at 25° C. and is capable of providing a continuous medium in which each of the other ingredients in the composition is either dissolved or dispersed. Preferably, each of the one or more polyisocyanate ingredient(s) is soluble in the solvent in the amount, by weight based on the weight of the solvent, of 10% or more; more preferably 50% or more; more preferably 100% or more. Preferably, each of the one or more polyol ingredient(s) is soluble in the solvent in the amount, by weight based on the weight of the solvent, of 10% or more; more preferably 50% or more; more preferably 100% or more. Also contemplated are embodiments ("solvent-free embodiments") in which little or no solvent is used. It is contemplated that, in solvent-free embodiments, the ingredients are chosen so that the composition of the present invention is liquid at 25° C.

When a solvent is used, preferred solvents are hydrocarbon solvents, polar aprotic solvents, polar protic solvents, and mixtures thereof; more preferred are polar aprotic solvents, more preferred are ethyl acetate, acetone, and methyl ethyl ketone; more preferred is ethyl acetate.

When a solvent is used, the preferred amount of solvent, by weight based on the total weight of the composition, is 10% or more; more preferably 20% or more; more preferably 40% or more. When a solvent is used, the preferred amount of solvent, by weight based on the total weight of the composition, is 80% or less; more preferably 60% or less.

The composition of the present invention optionally contains one or more silane adhesion promoter. Preferred silane adhesion promoters contain one or more reactive organic epoxide group and one or more alkoxysilyl group, more preferably one or more methoxysilyl or ethoxysilyl group. When a silane adhesion promoter is used, a preferred amount, in parts by weight based on 100 parts by weight of the total weight of all polyols, is 0.05 parts or more; more preferably 0.1 parts or more; more preferably 0.2 parts or more. When a silane adhesion promoter is used, a preferred amount, in parts by weight based on 100 parts by weight of the total weight of all polyols, is 5 parts or less; more preferably 2 parts or less; more preferably 1 part or less.

The adhesive composition may optionally contain one or more additional conventional ingredients such as fillers, pigments, tackifiers, plasticizers, rheology modifiers, polymers (including, for example, thermoplastic resins other than those discussed herein above), dehydrating agents (including, for example, silanes), benzoyl chloride, other polyols (including, for example, fatty polyols), ultraviolet indicators, etc.

Preferably, the adhesive composition of the present invention is curable. Preferably, the adhesive composition of the present invention undergoes one or more chemical reactions that desirably effects an increase in the molecular weight of the composition and/or effects crosslinking of the composition so as to improve the properties of the composition. Preferably, the chemical reactions of curing involve reaction of isocyanate groups with hydroxyl groups to form urethane linkages.

In embodiments that involve application of the adhesive composition of the present invention to at least one substrate, the application is preferably effected by conventional means such as, for example, spray applicator, bead applicator, nozzle, doctor blade, extrusion, or roll coater, to form a continuous or discontinuous film of the adhesive composition.

The composition is preferably applied at a level, in grams of dry composition per square meter, of 0.5 or greater; more preferably 1 or greater. The composition is preferably applied at a level, in grams of dry composition per square meter, of 10 or less; more preferably 7 or less.

Preferably, the curable adhesive composition of the present invention is used as an adhesive to bond a first substrate to at least one subsequent substrate. In such embodiments, the adhesive composition is applied to a first substrate, and, subsequently or simultaneously, the applied adhesive composition is contacted by at least one subsequent substrate to provide a bonded assembly.

In preferred embodiments of the present invention, the curable adhesive composition of the present invention is applied to, or otherwise contacted to, one or more substrates. Some suitable substrates include, for example, wood (including natural wood, plywood, lauan wood, and particle board), metal, plastics (including rigid plastics, flexible plastics, plastic films, and plastic foams), composite materials, fabric (including woven and non-woven), paper, oriented strand board, and combinations thereof. If more than one substrate is used, any combination of suitable substrates is also suitable. In some embodiments, all the substrates will be made of the same material; in other embodiments, two or more different materials will be used as substrates.

Preferably, one or more of the substrates is metal.

Preferably, one or more substrates is a polymer film. Preferred polymer films contain organic polymer. Preferred organic polymers are polyesters, polyolefins (including copolymers of olefins with other monomers), polyamides, and blends thereof. More preferred organic polymers are polyethylene terephthalate, polyethylene, polypropylene, and nylon.

A preferred use of the composition of the present invention is as an adhesive in a laminate. A laminate is a structure that contains two films bonded together with an adhesive layer. The "flat face" of the film is the surface that is perpendicular to the thickness direction. In a laminate the adhesive is in contact with a flat face of one film and a flat face of the other film. A laminate of the present invention contains a film that is bonded to another film using a composition of the present invention as the adhesive. Laminates of the present invention may contain additional layers of bonded films, each of which may be bonded to its adjacent layer with the composition of the present invention or with a different adhesive.

A preferred method of making a laminate is to apply a layer of the composition of the present invention to a flat face of one film, then remove solvent (if any), preferably by evaporation, then bring the flat face of the second substrate into contact with the layer of the composition of the present invention to form the laminate, and then to heat the entire laminate to cure the composition of the present invention.

It is to be understood that for purposes of the present examples that each operation disclosed herein is performed at 25° C. unless otherwise specified.

The following are examples of the present invention.

The following terms and abbreviations are used:
OHN=OH number, measured by ASTM D 4274-88
AV=Acid Value, measured by ASTM D 3644-83 (synonymous with "acid number")

VISC=viscosity, measured with a Brookfield DVII+ viscometer with a thermostated small sample adapter, using spindle SC-27. The rotation rate varied from 6 to 60 rpm as needed to obtain viscosity readings Viscosity (C&P)=viscosity measured with TA INSTRUMENTS AR 2000 rheometer using a 40 mm cone and Peltier plate for temperature control, cone angle=0° 30 min 4 sec, shear rate=10 sec$^{-1}$ % NCO is measured by ASTM 2572-70

Molecular weights are measured by Liquid size exclusion chromatography ASTM D3536-76 or D3593-80

Tg=glass transition measured by Differential Scanning calorimetry using the midpoint method and ramp rate of 10° C./min.

pbw=parts by weight

PPA=polyphosphoric acid, 115% grade

PA=phosphoric acid, 100% (solid)

DPG=Dipropylene Glycol (ALDRICH Chemical Co.)

EtAc=ethyl acetate

Preparation of Laminate:

Films tested were:

PET=24 micrometer thick polyethylene terephthalate (92LBT);

pre-laminated film made from a polyethylene terephthalate (PET, 12 micron (μm) thick) laminated to soft lamination grade AMCOR aluminum foil (9 μm thick) with ADCOTE™ 550/COREACTANT F (Dow Chemical Co.). This laminated structure was obtained from AMPAC Company, Cary, Ill. and is referred to as "Prelam" or PET-Al;

Pliant 808.24=polyethylene sealant film from Berry Plastics.

GF-19=polyethylene sealant film containing high amount of slip additive from Berry Plastics PET=polyethylene terephthalate, Samples of the films were cut into approximately 23×30 cm (9 inch×12 inch) sections. PET and polyethylene films were corona treated to obtain a surface energy of 38 dynes or higher. The secondary film was placed on the rubber pad of the laminator (treated side up). A strip of paper about 5 cm wide and 20 cm long was laid across the center of the sheet to provide an un-laminated strip area to separate the films for the peel testing. The two components of the adhesive were combined and diluted to 35-50% solids (usually 40% solids).

The primary film was attached to a hard flat surface (treated side up). The adhesive was applied to the aluminum side of the PET-Al laminate or to polyester film with a #6 Meyer wire wound rod (primary film). The coat weight was approximately 3.25 g/m$^2$ (2.0 lbs/ream). If necessary, the adhesive concentration was adjusted or a more suitable rod was selected to obtain the target coat weight. The solvent was evaporated from the adhesive by placing the coated film in an 80° C. forced air oven for about 30 seconds. The primary film was removed from the plate and the top edge of the film (adhesive side down) mated to the top of the secondary film on the laminator pad. The oil heated (approximately 82° C.) roller of the laminator was passed over the films putting the primary film in contact with the secondary film and laminating the two films together. The laminate sheets were placed between two hard surfaces (e.g. steel plates) with sufficient weight (c.a. 500 Kg) on the top sheet to keep the sheets of laminate pressed together until curing was complete.

Testing Laminates

The 90° T-peel test was done on laminate samples cut to 15 mm or 25.4 mm (1 inch) wide strips and pulled on Thwing Albert™ tensile tester at a rate of 25.4 cm/min (10 inch/min) for the 25.4 mm (1 inch) strips or 10.2 cm (4 inches)/min for 15 mm strips. When the two films in the laminate separated (peeled), the average of the force during the pull was recorded. If one of the films stretched or broke, the maximum force or force at break was recorded. The values were the average of three separate sample strips. The failure mode ("FM") was recorded as follows:

FS=Film Stretch

PFS=Partial Film Stretch (Film stretches and at the same time, peels to some extent)

FT=Film Tears or breaks

1°=Primary web (the adhesive is coated on to the primary web or film)

2°=Secondary web (film that is laminated to the primary web, often a sealant film like polyethylene)

AF=Adhesive Failure (adhesive is on the primary film, fails to adhere to the secondary film)

AT=Adhesive transfer (adhesive fails to adhere to the primary film and is transferred to the secondary film).

AS=Adhesive Split or cohesive failure (adhesive is found on both primary and secondary films.

Delam=Laminated films separated during test (e.g. during boil in bag test), little or no adhesion between films.

The initial or "green" bonds were tested as soon as possible after the laminate was made. Additional T-peel tests were conducted at the time intervals indicated (usually after 1 day, and 7 days).

Boil in Bag ("BB 1:1:1") Test Procedure:

Laminates were made from the "prelam" film, PET-Al which was bonded to the polyethylene sealant film (Pliant 808.24 from Berry plastics) as described above. One of the 9"×12" (23 cm×30.5 cm) sheets of laminate was folded over to give a double layer about 9"×6"(23 cm×15.25 cm). The edges were trimmed on a paper cutter to give a folded piece about 5"×7" (12.7×17.8 cm) Two long sides and one short side was heat sealed at the edges to give a finished pouch with an interior size of 10.2 cm×15.2 cm (4 inch×6 inch). The heat sealing was done at 177° C. (350° F.) for 1 second at a hydraulic pressure of 276 kpa (40 PSI). Two or three pouches were made for each test. Pouches were filled through the open edge with 100±5 ml of 1:1:1 sauce (blend of equal parts by weight of ketchup, vinegar and vegetable oil). Splashing the filling onto the heat seal area was avoided as this could cause the heat seal fail during the test. After filling, the top of the pouch was sealed in a manner that minimized air entrapment inside of the pouch.

The seal integrity was inspected on all four sides of pouches to ensure that there were no flaws in the sealing that would cause the pouch to leak during the test. Any suspect pouches were discarded and replaced. In some cases flaws in the laminate were marked to identify whether new additional flaws were generated during the testing.

A pot was filled ⅔ full of water and brought to a rolling boil. The boiling pot was covered with a lid to minimize water and steam loss. The pot was observed during the test to ensure that there was enough water present to maintain boiling. The pouch(es) were placed in the boiling water and kept there for 30 minutes. The pouches were removed and the extent of tunneling, blistering, de-lamination, or leakage, was compared with any of the marked preexisting flaws. The observations were recorded. The pouches were cut open, emptied and rinsed with soap and water. One or more 2.54 cm (one inch) strips were cut from the pouches and the laminate bond strength was measured on a tensile tester. This was done as soon as possible after removing the pouch contents. The interior of pouches was examined and any other visual defects were recorded.

The Water Soak test was performed as follows: After allowing the laminates to cure for 7 days, three strips one inch (2.54 cm) wide and about 6 inches (15 cm) were cut from the laminate sheets. These strips were placed in a jar of water and kept completely submerged by attaching a weight (like a heavy paper clip) to the strips. After standing overnight at ambient temperature, the strips were removed and the T-peel test was done within a few minutes.

The Heat Seal Test was performed as follows: A sample approximately 30 cm×20 cm was cut from a laminate sheet. The sample was folded and the long edge of the sheet was placed in a heat sealer at about 177° C. (350° F.) for one second at a pressure of 276 kpa (40 PSI). This sheet with the sealed edge was cut into 1 inch (2.54 cm) wide strips. The looped edge opposite the heat sealed edge was cut to give a strip with the heat sealed portion in the middle. The ends of the strip were placed in the jaws of an INSTRON tensile tester and pulled at 10 inches (25.4 cm) per minute. The force required to break the film at the heat seal was recorded. Also, any delamination that may have occurred during the test was noted. Heat seal results are reported in units of Newtons per 25.4 mm of width.

Adhesive Preparation

Samples in the following Examples were prepared by combining the polyol portion of the adhesive with the additives shown the tables followed by addition of solvent (where shown) to obtain the desired final concentration then adding the isocyanate functional portion and mixing for about 15 minutes.

EXAMPLE 1

ADCOTE™ 577 (available from Dow Chemical Company) is an isocyanate functional prepolymer comprised of about 72-74% polyurethane resin, 2-3% methylenebis (4-phenylisocyanate) and 23-25% ethyl acetate. Typical viscosity (Technical Data Sheet) is 3900 mPa*s.

EXAMPLE 2. POLYESTER-POLYETHER POLYOL

The method described in WO 2013/053555 was used. 2011.0 g (7.89 mol) of VORANOL™ CP260 triol polyether polyol, 1520.4 g (10.25 mol) phthalic anhydride and 0.20 g of 2-Ethyl-4-Methyl-Imidazole (EMI, 41 ppm based on the weight of product) were mixed with stirring at 50 rpm in 5 L stainless steel alkoxylation reactor. The reaction mixture was flushed 10 times with 600 kPa (6 bar) nitrogen ($N_2$) pressure. The reactor was thermostated at 130° C. with 600 kPa (6 bar) of $N_2$ pressure. The obtained slurry gradually dissolved in the reactor, becoming mainly liquid after 0.5 h at this temperature. The stirring rate was gradually increased from 50 to 200 rpm. The reactor content was stirred for an additional 1.5 h. The $N_2$ pressure in the reactor was reduced to 1.0 bar, and the stirring rate was increased to 300 rpm. PO (1246.0 g, 21.46 mol) was fed to the reactor at a feed rate of 15 g/min over 85 min. The immediate reaction start was accompanied by an exotherm. At the completion of the feed the total pressure in the reactor had reached 490 kPa (4.9 bar). 3.0 h of additional digestion time was allowed. The total pressure in the reactor decreased to 430 kPa (4.3 bar). The reactor temperature was decreased to 100° C. 6.80 g of a 10% solution of triflic acid (TFA, 142 ppm based on the weight of product) in ethanol was injected into the reactor with the help of a pressurized stainless steel bomb, connected to the reactor Immediate pressure drop in the reactor and an exotherm were observed, 30 min of additional digestion time was allowed. Residual nitrogen pressure was vented off, the reaction mixture was flushed 10 times with 600 kPa (6 bar) $N_2$ pressure. Potassium hydroxide (7.16 g, 0.5 mol/l solution in ethanol) was injected into the reactor with the help of a pressurized stainless steel bomb, connected to the reactor, in order to neutralize the remaining triflic acid. The product was then stripped in vacuum for 1 h at 120° C. A colorless viscous liquid was obtained.

The produced hybrid polyester-polyether polyol had the following properties: OHN: 276 mg KOH/g; Cone and Plate Viscosity (40 mm diameter, 0.5° cone, 10 $sec^{-1}$) at 25° C.: 31700 mPa*s (Density at 25° C.: 1.156 $g/cm^3$; pH: 5.9; Mn=460 g/mol, Mw/Mn=1.17.

EXAMPLE 3

MOR-FREE™ C411 (Dow Chemical Company) is a solvent free blend containing polyester polyol with typical viscosity reported as 1100 mPa*s

EXAMPLE 4. PREPARATION OF POLYETHER PHOSPHATES

Reactant quantities are shown in the table below. A 1 L multi-neck round bottom flask was dried in an oven, flushed with dry $N_2$ for 30 minutes, then charged with polyether polyol and placed under an $N_2$ sweep of 70 mL/min A syringe was loaded with 115% Polyphosphoric acid (PPA) from ALDRICH CHEMICAL Company. PPA was added dropwise from the syringe to the polyether polyol with strong agitation. A minimal rise in temperature was noted. The reactor contents were then heated to 100° C. for 1 hour, cooled (significant increase in viscosity was observed), and the clear and colorless product was packaged.

For comparison, sample 4F was prepared by adding 100% phosphoric acid (PA) crystals to VORANOLTMCP 450. The mixture was warmed to 50° C. and stirred until the crystals were completely dissolved.

Results:

| Example | Precursor polyol type | Precursor polyol amount (g) | PPA (g) | PA (g) |
|---|---|---|---|---|
| 4A | VORNAOL ™ CP 450 polyol[1] | 180 | 20 | |
| 4B | VORNAOL ™CP 450 polyol[1] | 192 | 8 | |
| 4C | VORNAOL ™CP 450 polyol[1] | 196 | 4 | |
| 4D | POLY-G ® 30-240 polyol[2] | 196 | 4 | |
| 4E | VORANOL ™ CP 1055 polyol[3] | 196 | 4 | |
| 4F | VORNAOL ™CP 450 polyol[1] | 196 | | 4 |

[1]The Dow Chemical Company, average molecular weight = 450
[2]The ARCH Chemical Company, average molecular weight = 700
[3]The Dow Chemical Company, average molecular weight = 1055

| Example | VISC (mPa * s) | OHN | AV |
|---|---|---|---|
| 4A | 6700 | 402 | 45.2 |
| 4B | 820 | 393 | 25.8 |
| 4C | 550 | 387 | 9.7 |
| 4D | 415 | 240 | 11.1 |
| 4E | 460 | 159 | 12.3 |
| 4F | | 369 | 18.5 |

EXAMPLE 5: PREPARATION OF URETHANE-POLYETHER PHOSPHATE

Reactant quantities are in the table below. A 1 L multi-neck round bottom flask was dried in an oven, flushed with dry $N_2$ for 30 minutes, then charged with VORANOL™ CP 450 polyether polyol and placed under an $N_2$ sweep of 70 mL/min A syringe was loaded with 115% Polyphosphoric acid (PPA) from ALDRICH CHEMICAL Co. The PPA was added dropwise to the polyether polyol with strong agitation. A minimal temperature increase was observed. The reactor contents were heated to 100° C. for 1 hour, then cooled to 45° C. ISONATE™ 125M polyisocyanate was added. The temperature rose to about 95° C. from the heat of reaction. Also, there was an increase in viscosity and development of a yellow color. The reactor was then brought to 65° C., and ethyl acetate was added to cut viscosity and improve stirring. After 1 hour, the reactor was cooled and the content was packaged.

| Example | VORNAOL™ CP 450 (g) | PPA (g) | Ethyl Acetate (g) | ISONATE™ 125M (g) | VISC |
|---|---|---|---|---|---|
| 5 | 150 | 4 | 40 | 50 | 42,750 mPa * s |

EXAMPLE 6: TESTING ADHESIVES

Samples in the following tables were prepared by combining the polyol portion of the adhesive with the additives shown the tables followed by addition of solvent to obtain the desired final concentration, then adding the isocyanate functional portion and mixing for about 15 minutes.

The tables below summarize T-peel test results for PET-Al/Pliant 808.24 laminates. Adhesive coat weight (dry) was approximately 3.26 g/m² (2.0 lbs/ream). T-peel results are shown at various times. Also shown are the results of the boil in bag test with the 1:1:1 sauce (blend of equal parts by weight of vinegar, oil and ketchup). The data show that the most of the laminates made with phosphate-functional polyol gave cured bonds comparable with the control adhesive but green bonds (that is, T-peel values at short time) were significantly better than the controls. Higher green bonds are desirable because this simplifies the lamination process and helps avoid defects that may result from the two films moving before the laminate has cured. Once the adhesive has cured, the desired mode of failure is film stretch (FS) or film tear (FT). The control adhesive was made with the isocyante functional prepolymer of Example 1 as one component and the coreactant ADCOTE™577B polyol (herein "polyol CON") as the second component. ADCOTE™577B is a blend containing polyester and polyether polyols and 28-30% ethyl acetate with a typical viscosity (Technical Data Sheet) of 130 mPa*s. It is available from Dow Chemical Company.

Samples made with VORANOL™ CP 1055 polyol gave poor green bonds due to limited miscibility of the CP 1055 polyether with Example 1 prepolymer. For all of the samples 4A-4E, T-peel bonds after the boil in bag tests were as good as or better than the control adhesive and better than the comparative examples without PPA Some defects ("blisters") were seen in some samples with higher concentrations (4-10%) of PPA in VORANOL™ CP 450 (e.g. 4A and 4B). "Blisters" refers to small bubbles that appear in the laminate surface after exposure to boil in bag testing. Table 5 shows that 100% phosphoric acid (PA) does not give the benefit of resistance to the 1/1/1 sauce that is observed with the polyols reacted with PPA. "Tunneling" refers to channels that form from areas of delamination where the two films have separated during the test. This is a major defect. The following tables 1-9 show results of laminates of PET-Al prelam (primary substrate) with Pliant 808.24 (secondary substrate).

TABLE 1A

| | Formulations | | | | |
|---|---|---|---|---|---|
| Name | Control Wt. (g) | 59-5 Wt. (g) | 59-6 Wt. (g) | 69-5 Wt. (g) | 69-6 Wt. (g) |
| Example 1 polyol CON | 14.77 1.30 | 15.52 | 15.46 | 15.32 | 15.14 |
| Example 4A | | 0.08 | 0.16 | | |
| Example 4B | | | | 0.37 | |
| Example 4C | | | | | 0.61 |
| DPG | | 0.28 | 0.25 | 0.15 | 0.04 |
| EtAc | 13.93 | 14.12 | 14.13 | 14.16 | 14.21 |

TABLE 1B

T-Peel Results (grams per 2.54 cm (g/inch))

| | Control | | 59-5 | | 59-6 | |
|---|---|---|---|---|---|---|
| | T-peel | FM | T-peel | FM | T-peel | FM |
| Green | 156 | AS | 385 | AS | 425 | AS |
| 1 Day | 1260 | FS | 1792 | FS | 1654 | FS |
| 7 Day | 1551 | FT/FS | 1834 | FS | 1697 | FS |
| 14 Day | 1692 | FS | 1839 | FS | 1739 | FT/FS |
| BB 1:1:1 | 790 | AT | 1859 | FS/FT | 1287 | FS/AS |
| Comment | | No Defect | | Blisters | | No Defect |

TABLE 1C

Further T-Peel Results (grams per 2.54 cm (g/inch))

| | 69-5 | | 69-6 | |
|---|---|---|---|---|
| | T-peel | FM | T-peel | FM |
| Green | 340 | AS | 335 | AS |
| 1 Day | 1495 | FS/FT | 1556 | FS |
| 7 Day | 1719 | FS | 1678 | FS |
| 14 Day | 1830 | FS | 1805 | FS/FT |
| BB 1:1:1 comment | 1763 | FS Slight Blistering | 1766 | FS Slight Blistering |

TABLE 2A

| | Formulations | | | | |
|---|---|---|---|---|---|
| Name | Control Wt. (g) | 59-3 Wt. (g) | 59-4 Wt. (g) | 69-3 Wt. (g) | 69-4 Wt. (g) |
| Example 1 polyol CON | 14.77 1.30 | 14.91 | 14.91 | 15.00 | 15.06 |
| Example 3 | | 0.75 | 0.67 | 0.38 | 0.11 |
| Example 4A | | 0.075 | 0.15 | | |
| Example 4B | | | | 0.38 | |
| Example 4C | | | | | 0.60 |
| EtAc | 13.93 | 14.27 | 14.27 | 14.24 | 14.23 |

TABLE 2B

T-Peel Results (grams per 2.54 cm (g/inch))

|  | Control | | 59-3 | | 59-4 | |
| --- | --- | --- | --- | --- | --- | --- |
|  | T-peel | FM | T-peel | FM | T-peel | FM |
| Green | 156 | AS | 319 | AS | 377 | AS |
| 1 Day | 1260 | FS | 1878 | FS/FT | 1762 | FS |
| 7 Day | 1551 | FT/FS | 1748 | FS | 1758 | FS/FT |
| 14 Day | 1692 | FS | 1974 | FT/FS | 1860 | FS |
| BB 1:1:1 | 790 | AT | 1673 | FT/FS | 1842 | FS |
| comment |  | No Defect |  | Blisters |  | No Defect |

TABLE 2C

Further T-Peel Results (grams per 2.54 cm (g/inch))

|  | 69-3 | | 69-4 | |
| --- | --- | --- | --- | --- |
|  | T-peel | FM | T-peel | FM |
| Green | 347 | AS | 356 | AS |
| 1 Day | 1600 | FS | 1593 | FS |
| 7 Day | 1743 | FS | 1636 | FS/FT |
| 14 Day | 1857 | FT/FS | 1806 | FS |
| BB 1:1:1 | 1907 | FS | 1805 | FS |
| comment |  | No Defect |  | No Defect |

TABLE 3A

Formulations

| Name | Control Wt. (g) | Comparative 91-10-1 Wt. (g) | 91-10-2 Wt. (g) |
| --- | --- | --- | --- |
| Example 1 | 14.77 | 15.09 | 15.09 |
| polyol CON | 1.30 |  |  |
| Example 4C |  |  | 0.679 |
| VORANOL™ CP 450 |  | 0.68 |  |
| EtAc | 13.93 | 14.23 | 14.23 |

TABLE 3B

T-Peel Results (grams per 2.54 cm (g/inch))

|  | Control | | Comparative 91-10-1 | | 91-10-2 | |
| --- | --- | --- | --- | --- | --- | --- |
|  | T-peel | FM | T-peel | FM | T-peel | FM |
| Green | 156 | AS | 344 | AS | 340 | AS |
| 1 Day | 1260 | FS | 1788 | FS | 1966 | FS |
| 7 Day | 1551 | FT/FS | 1784 | FS | 1906 | FS |
| 14 Day | 1692 | FS | 1548 | FS | 1637 | FS/FT |
| BB 1:1:1 | 790 | AT | 1233 | AS | 1577 | FS |
| comment |  | No Defect |  | Slight tunneling |  | No Defect |

TABLE 4A

Formulations

| Name | Control Wt. (g) | 58-59-1 Wt. (g) | 58-59-2 Wt. (g) | 58-69-1 Wt. (g) | 58-69-2 Wt. (g) |
| --- | --- | --- | --- | --- | --- |
| Example 1 | 14.77 | 14.81 | 14.81 | 14.86 | 14.95 |
| polyol CON | 1.30 |  |  |  |  |
| Example 4A |  | 0.07 | 0.15 |  |  |
| Example 4B |  |  |  | 0.19 |  |
| Example 4C |  |  |  |  | 0.37 |
| Example 2 |  | 0.81 | 0.74 | 0.67 | 0.41 |
| EtAc | 13.93 | 14.30 | 14.30 | 14.28 | 14.27 |

TABLE 4B

T-Peel Results (grams per 2.54 cm (g/inch))

|  | Control | | 58-59-1 | | 58-59-2 | |
| --- | --- | --- | --- | --- | --- | --- |
|  | T-peel | FM | T-peel | FM | T-peel | FM |
| Green | 156 | AS | 513 | AS | 498 | AS |
| 1 Day | 1260 | FS | 1798 | FS/FT | 1789 | FS |
| 7 Day | 1551 | FT/FS | 1775 | FS | 1790 | FS |
| 14 Day | 1692 | FS | 1857 | FS/FT | 2036 | FS |
| BB 1:1:1 | 790 | AT | 1812 | FS/FT | 1631 | FS |
| comment |  | No Defect |  | No Defect |  | Blisters |

TABLE 4C

Further T-Peel Results (grams per 2.54 cm (g/inch))

|  | 58-69-1 | | 58-69-2 | |
| --- | --- | --- | --- | --- |
|  | T-peel | FM | T-peel | FM |
| Green | 363 | AS | 353.7 | AS |
| 1 Day | 1613 | FS | 1614 | FS |
| 7 Day | 1772 | FS/FT | 1783 | FT |
| 14 Day | 1823 | FS/FT | 1722 | FS |
| BB 1:1:1 | 1850 | FS | 1853 | FS |
| comment |  | Slight Blistering |  | No Defect |

TABLE 5A

Formulations

| Name | 22-1 Wt. (g) | 22-2 Wt. (g) | 22-3 Wt. (g) | 22-4 Wt. (g) |
| --- | --- | --- | --- | --- |
| Example 1 | 15.09 | 15.09 | 15.19 | 15.00 |
| Example 4F | 0.68 | 0.30 | 0.53 | 0.45 |
| CP 450 |  | 0.38 |  |  |
| DPG |  |  | 0.08 |  |
| Example 2 |  |  |  | 0.30 |
| EtAc | 14.23 | 14.23 | 14.20 | 14.25 |

TABLE 5B

T-Peel Results (grams per 2.54 cm (g/inch))

| | 91-22-1 | | 91-22-2 | | 91-22-3 | | 91-22-4 | |
|---|---|---|---|---|---|---|---|---|
| | T-peel | FM | T-peel | FM | T-peel | FM | T-peel | FM |
| Green | 325 | AS | 326 | AS | 360 | AS | 324 | AS |
| 1 Day | 1462 | FS | 1300 | FS/AS | 1456 | FS | 929 | AS |
| 7 Day | 1659 | FS | 1687 | FS/FT | 1662 | FS | 1739 | FS/FT |
| 14 Day | 1697 | FS | 1590 | FS | 1817 | FS | 1603 | FS |
| BB 1:1:1 | 509 | AS | 763 | AS | 913 | AS | 822 | AS |
| comment | | Tunneling | | Tunneling | | Tunneling | | Tunneling |

TABLE 6A

Formulations

| Name | 91-21-1 Wt. (g) | 91-21-2 Wt. (g) | 91-21-3 Wt. (g) | 91-21-4 Wt. (g) |
|---|---|---|---|---|
| Example 1 | 14.19 | 14.43 | 14.76 | 14.56 |
| Example 5 | 1.63 | 0.94 | 0.96 | 0.95 |
| CP 450 | | | | 0.29 |
| DPG | | | 0.13 | |
| Example 2 | | 0.40 | | |
| EtAc | 14.18 | 14.23 | 14.15 | 14.20 |

TABLE 6B

T-Peel Results (grams per 2.54 cm (g/inch))

| | 91-21-1 | | 91-21-2 | | 91-21-3 | | 91-21-4 | |
|---|---|---|---|---|---|---|---|---|
| | T-peel | FM | T-peel | FM | T-peel | FM | T-peel | FM |
| Green | 369 | AS | 387 | AS | 351 | AS | 337 | AS |
| 1 Day | 1650 | FS | 1534 | FS | 1423 | FS | 1438 | FS |
| 7 Day | 1600 | FS | 1648 | FS | 1605 | FS | 1636 | FS |
| 14 Day | 1497 | FS | 1628 | FS | 1530 | FS/FT | 1651 | FS/FT |
| BB 1:1:1 | 1645 | FS | 1747 | FS | 1473 | FS | 1688 | FS |
| comment | | No Defect | | No Defect | | No Defect | | No Defect |

TABLE 7A

Formulations

| Name | 91-20-2 Wt. (g) | 91-20-3 Wt. (g) |
|---|---|---|
| Example 1 | 13.95 | 13.87 |
| Example 4E | 1.53 | 0.83 |
| CP 1055 | | 0.76 |
| EtAc | 14.52 | 14.54 |

TABLE 7B

T-Peel Results (grams per 2.54 cm (g/inch))

| | 91-20-2 | | 91-20-3 | |
|---|---|---|---|---|
| | T-peel | FM | T-peel | FM |
| Green[4] | 11.3 | Phase Sep.[4] | 6 | Phase Sep.[4] |
| 1 Day | 659 | AS | 519 | AS |
| 7 Day | 1743 | FS/FT | 1777 | FS |
| 14 Day | 1569 | FS | 1571 | FS |
| BB 1:1:1 | 1610 | FS | 1657 | FS |
| comment | | No Defect[4] | | No Defect[4] |

[4]Laminate showed some defects prior to BB 1:1:1 test because it was difficult to make good laminates with such low green bonds. But, no new defects appeared during the BB 1:1:1 test.

TABLE 8A

Formulations

| Name | 91-20-4 Wt. (g) | 91-20-5 Wt. (g) | 91-20-6 Wt. (g) |
|---|---|---|---|
| Example 1 | 14.29 | 14.65 | 14.46 |
| CP 450 | | | 0.29 |
| Example 4E | 0.86 | 0.88 | 0.87 |
| DPG | | 0.13 | |
| Example 2 | 0.43 | | |
| EtAc | 14.42 | 14.34 | 14.38 |

TABLE 8B

T-Peel Results (grams per 2.54 cm (g/inch))

| | 91-20-4 | | 91-20-5 | | 91-20-6 | |
|---|---|---|---|---|---|---|
| | T-peel | FM | T-peel | FM | T-peel | FM |
| Green[5] | 4.7 | Phase Sep.[5] | 5.3 | Phase Sep.[5] | 4 | Phase Sep.[5] |
| 1 Day | 822 | AS | 621 | AS | 725 | AS |
| 7 Day | 1799 | FS | 1722 | FS | 1785 | FS/FT |
| 14 Day | 1689 | FS | 1652 | FS | 1554 | FS |
| BB 1:1:1 | 1742 | FS | 1634 | FS | 1853 | FS |
| comment | | No Tunnel | | No Tunnel | | No Tunnel |

[5]Example is not fully miscible with Voranol™ CP 1055 polyol. This is responsible for the poor green bonds.

TABLE 9A

Formulations

| Name | 29-1 Wt. (g) | 29-2 Wt. (g) | 29-3 Wt. (g) |
|---|---|---|---|
| Example 1 | 14.63 | 14.55 | 14.63 |
| Example 4D | 1.0 | 0.65 | 0.66 |

TABLE 9A-continued

| | Formulations | | |
|---|---|---|---|
| Name | 29-1 Wt. (g) | 29-2 Wt. (g) | 29-3 Wt. (g) |
| PolyG ™ 30-240 | | 0.44 | |
| SP11-33 Ex | | | 0.37 |
| EtAc | 14.35 | 14.36 | 14.34 |

TABLE 9B

T-Peel Results (grams per 2.54 cm (g/inch))

| | 91-20-4 | | 91-20-5 | | 91-20-6 | |
|---|---|---|---|---|---|---|
| | T-peel | FM | T-peel | FM | T-peel | FM |
| Green[5] | 12 | Phase Sep.[6] | 5 | Phase Sep.[6] | 45 | Phase Sep.[6] |
| 1 Day | 1782 | FS | 1696 | FS | 1508 | FS |
| 7 Day | 1676 | FS | 1663 | FS | 1805 | FS |
| 14 Day | 1847 | FS | 1721 | FS | 1702 | FS |
| BB 1:1:1 | 1578 | FS | 1499 | FS | 1569 | FS |
| comment | | No Defect | | No Defect | | No Defect |

[6]Example is not fully miscible with Voranol ™ CP 1055 polyol. This is responsible for the poor green bonds.

EXAMPLE 7

ADCOTE™795 is the Hydroxyl Component of a Two Part Polyurethane adhesive. It is a blend containing hydroxyl functional polyester and hydroxyl functional acrylic polymers (70-80%), glycols (1-5%) and ethyl acetate 20-25%. It is available from Dow Chemical Company. Typical viscosity (from data sheet) 825 mPa*s.

EXAMPLE 8: PREPARATION OF ISOCYANATE-FUNCTIONAL PREPOLYMER

The ingredients were as follows:

| Item | Monomer/Intermediate | Charge (g) |
|---|---|---|
| 1 | 4,4'-Diphenylmethane diisocyanate (ISONATE ™ 125M) | 200.0 |
| 2 | Propoxylated Glycerine, Mw 450 (Voranol ™ CP450) | 7.46 |
| 3 | Polypropylene glycol, Mw 430 (Voranol ™ 220-260) | 97.4 |
| 4 | Benzoyl chloride | 0.10 |

Item 1 was charged to a dry reactor at 50° C. The reactor was kept under an atmosphere of dry nitrogen throughout the process. Item 2 was charged to the reactor and the resin mixture was heated to 80° C. Item 3 was added over 30 min at a rate to maintain the temperature at 80-85° C. The resin mixture was held at 80° C. for 2 hours. The % NCO was monitored until it was 15.0±0.3%. The resin was cooled to 50° C.-60° C., item 4 was added; the solution was mixed well, then packaged.

The final resin had the following properties: 14.8% NCO. Cone and plate viscosity (40 mm diameter, 0.5° cone, 10 sec$^{-1}$) results are shown in the table below.

| | Temp (° C.) | | | | | | |
|---|---|---|---|---|---|---|---|
| | 25 | 35 | 45 | 55 | 65 | 75 | 80 |
| VISC (mPa * s) | 20,070 | 6875 | 2475 | 1225 | 650 | 400 | 325 |

Dry ethyl acetate (30 g) was added to 170 g of the resin. The resin dissolved with stirring to give a solution with 85% solid resin and a viscosity of 325 mPa*s at 25°

EXAMPLE 9: PREPARATION OF GLYCERINE PHOSPHATE

Polyphosphoric acid (40 grams of 115% from Aldrich Chemical Co.) was placed in a three neck flask with stirrer, thermometer and nitrogen inlet/outlet. A slow stream of dry nitrogen was passed through the reactor throughout the reaction time. Glycerin (69.4 grams, Aldrich) was added with stirring. The heat of reaction caused the temperature to rise from 24° C. to 69° C. within 10 minutes. The solution was held at 60-70° C. for 45 minutes. The clear, colorless, viscous liquid product was cooled and packaged in a glass container.

EXAMPLE 10

Adhesive formulations were prepared by adding phosphate esters to Example 7 and combining this with the isocyanate functional coreactant (Example 8). Laminates were made from these blends as described earlier. Results were as follows. For each laminate, the first substrate listed was the primary substrate.

TABLE 10A

Formulations

| Name | 99-4 pbw | 99-6C[7] pbw |
|---|---|---|
| Example 7 polyol | 100 | 100 |
| Example 8 polyisocyanate | 22.5 | 24 |
| Example 9 glycerine phosphate | 0.25 | |

[7]Comparative sample, (no phosphate functional polyol)

TABLE 10B

T-Peel Results (grams of force per 2.54 cm (g/inch))

| | 99-4 | | |
|---|---|---|---|
| | T-peel | FM | 99-6C[8] |
| Initial | | | |
| PET-Al/808.24 | 119 | AS | 238 AS |
| PET-Al/PET | 56 | AS | 125 AS |
| PET/GF 19 | 126 | AS | 279 AS |
| 24 hr | | | |
| PET-Al/808.24 | 1387 | FS | 1389 FS |
| PET-AL/PET | 725 | FT | 293 AT |
| PET/GF 19 | 1116 | FT | 353 AT |
| 7 day | | | |
| PET-Al/808.24 | 1543 | FS | 1415 FS |
| PET-Al/PET | 722 | FT | 556 AT |
| PET/GF 19 | 1138 | FS | 1129 FT |

[8]Comparative sample, (no phosphate functional polyol)

TABLE 10C

Further Results (g/2.54 cm)

|  | 99-4 | | 99-6C[9] | |
|---|---|---|---|---|
|  | T-peel | FM | T-peel | FM |
| Water soak | | | | |
| PET-Al/808.24 | 887 | AT | 78 | AT |
| PET-Al/PET | 577 | AT | 229 | AT |
| PET/GF 19 | 951 | FT | 1129 | FT |
| Boil Bag water | 782 | AT | 289 | AT |
| Boil Bag 1, 1, 1 | 471 | AT | 282 | AT |
| Heat seal (N/25.4 mm) | 70.92 | FT | 71.71 | FT |

[9]Comparative Samples (no phosphate functional polyol)

EXAMPLE 11: PREPARATION OF ISOCYANATE-FUNCTIONAL PREPOLYMER

| Item | Monomer/Intermediate | Charge (g) |
|---|---|---|
| 1 | 4,4'-Diphenylmethane diisocyanate (ISONATE ™ 125M) | 577.7 |
| 2 | Propoxylated Glycerine, Mw 450 (Voranol ™ CP450) | 135.6 |
| 3 | Polypropylene glycol, Mw 430 (Voranol ™ 220-260) | 148.9 |
| 4 | Benzoyl chloride | 0.10 |

Item 1 was charged to a dry reactor at 50° C. The reactor was kept under an atmosphere of dry nitrogen throughout the process. Item 2 was charged to the reactor and the resin mixture was heated to 80° C. Item 3 was added over 30 min at a rate to maintain the temperature at 80-85° C. The resin mixture was held at 80° C. for 2 hours. The % NCO was monitored until it was 15.0±0.3%. The resin was cooled to 50° C.-60° C., item 4 was added; the solution was mixed well, then packaged (12.4% NCO, Brookfield viscosity 810 mPa*s).

EXAMPLE 12. PREPOLYMER WITH POLYCARBODIIMIDE MODIFIED MDI

| Item | Monomer/Intermediate | Charge (g) |
|---|---|---|
| 1 | 4,4'-Diphenylmethane diisocyanate (ISONATE ™ 125M) | 78.5 |
| 2 | ISONATE ™ 143L polycarbodiimide-modified diphenylmethane diisocyanate | 160.3 |
| 3 | Propoxylated Glycerine, Mw 450 (Voranol ™ CP450) | 31.1 |
| 4 | Polypropylene glycol, Mw 430 (Voranol ™ 220-260) | 68.9 |
| 5 | 85% Phosphoric Acid | 0.08 |
| 6 | Ethyl Acetate | 59 |

Charged items 1-6 with stirring. Gradually heated to 50-55° C. over 30 minutes. Continued heating to 75° C. over 30 minutes. Held at 73-77 C for 90 minutes. Collected light yellow product: 12.3% NCO; Brookfield viscosity 1620 mPa*s (#5 spindle at 20 rpm).

EXAMPLE 13. PREPARATION OF POLYESTER RESIN

| Item | Monomer/Intermediate | Weight % e |
|---|---|---|
| 1 | Phthalic Anhydride | 42.86 |
| 2 | Diethylene Glycol | 33.35 |
| 3 | FASCAT 9100 (Hydroxybutyltin oxide) | 0.07 |
| 4 | Ethyl acetate | 23.72 |

Items 1-3 were charged to a reactor equipped with a stirrer, thermocouple, nitrogen inlet, a steam jacketed fractionating column and a condenser for collecting water that distilled from the reactor. A very slow stream of nitrogen was passed through the head space of the reactor throughout the time of the reaction.

The heterogeneous mixture was heated to 100-120° C. The external heat was reduced and the heat of reaction carried the temperature to about 130° C. The temperature was held at 120-130° C. for 0.25-0.50 Hrs.

The resin mixture was heated gradually to 225° C. At about 190° C. water began to distill. After 85-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 450 torr. The vacuum was gradually decreased to about 25 torr. Pressure was held at about 20-30 torr and the temperature maintained at 225° C. until the acid number was less than 2.0 mg KOH/g sample.

The product was cooled and combined with the ethyl acetate. The resin had the following properties: 74.7% solids, OHN 24 mg KOH/g; acid value 1.4, OHN 24; viscosity (C&P) 814 mPa*s at 25° C.

EXAMPLE 14: ADHESIVE FORMULATIONS

Samples in the following tables were prepared by combining the polyol portion of the adhesive with the additives, mixing thoroughly and allowing the resulting solution to stand for at least 24 hours at room temperature. When preparing laminates, the polyol blend was combined with the coreactant (NCO terminated prepolymer) in the proportion shown in the tables. Ethyl acetate was added to the blends in sufficient quantity to obtain a solution with 35-40% solids and laminates were prepared and tested as described previously. For all samples in table 14, the ratio of NCO equivalents/OH equivalents was about 1.4.

TABLE 14A

| | Formulations | | | |
|---|---|---|---|---|
| | 66-1A pbw | 66-1C pbw | 66-2A pbw | 66-2B pbw |
| Polyol Portion | | | | |
| Example 13 Polyester | 100 | 100 | 97 | 97 |
| Example 4C (2% PPA CP 450) | | | 3 | 3 |
| Isocyanate Coreactant Portion | | | | |
| Example 11 | | 23 | 32 | |
| Example 12 | 24 | | | 32 |

TABLE 14B

| | 66-1A | | 66-1C | | 66-2A | | 66-2B | |
|---|---|---|---|---|---|---|---|---|
| | T-Peel | FM | T-Peel | FM | T-Peel | FM | T-Peel | FM |
| Initial | 396 | AS | 592 | AS | 305 | AS | 292 | AS |
| 1 day | 1790 | FS | 1437 | FS | 1876 | FS | 1720 | FS |
| 7 day | 1803 | FS | 1450 | FS | 1947 | FS | 1834 | FS |
| 14 day | 1836 | FS | 1879 | FS | 1976 | FS | 2006 | FS |
| BB 1:1:1 | | | | | 1560 | FS | 499 | PFS |
| Comment | | Delam | | Delam | | | | |

Both 66-1A and 66-2B use Example 12 as the polyisocyanate. Sample 66-1A shows delamination in the BB 1:1:1 test, while sample 66-2B does not. Both 66-1C and 66-2A use Example 11 as the polyisocyanate. Sample 66-1C shows delamination in the BB 1:1:1 test, while sample 66-2A does not. These results demonstrate the benefit of the phosphate functional polyol, which is only present in samples 66-2A and 66-2B.

The invention claimed is:

1. An adhesive composition comprising one or more polyisocyanates and one or more phosphate-functional polyols, wherein said one or more phosphate-functional polyols is a phosphate ester of a precursor polyol.

2. The adhesive composition of claim 1, wherein said precursor polyol is either an alkyl triol or alkoxylated alkyl triol.

3. The adhesive composition of claim 1, wherein said precursor polyol is either glycerol or alkoxylated glycerol.

4. The adhesive composition of claim 1, wherein said precursor polyol is a propoxylated glycerol.

5. A method of bonding two substrates together to form a bonded article, said method comprising the steps of applying a layer of the adhesive composition of claim 1 to one of said substrates, contacting said layer of the adhesive composition of claim 1 to a second substrate, and curing or allowing to cure the adhesive composition of claim 1.

6. A bonded article formed by the method of claim 5.

7. The bonded article of claim 6, wherein said bonded article is a laminate.

* * * * *